US006952089B2

(12) United States Patent
Matsuo

(10) Patent No.: US 6,952,089 B2
(45) Date of Patent: Oct. 4, 2005

(54) MOTOR DRIVE WITH VOLTAGE-ACCURATE INVERTER

(75) Inventor: Takayoshi Matsuo, Himeji (JP)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 50 days.

(21) Appl. No.: 10/651,672

(22) Filed: Aug. 29, 2003

(65) Prior Publication Data

US 2005/0046380 A1 Mar. 3, 2005

(51) Int. Cl.[7] .................................................. H02P 5/28

(52) U.S. Cl. ....................... 318/811; 318/801; 318/802; 318/805; 318/812

(58) Field of Search ................................ 318/811, 801, 318/802, 805, 812; 363/41

(56) References Cited

U.S. PATENT DOCUMENTS

| | | | | | |
|---|---|---|---|---|---|
| 4,607,274 | A | * | 8/1986 | Yoshitake | 257/357 |
| 5,450,306 | A | | 9/1995 | Garces et al. | |
| 6,404,655 | B1 | * | 6/2002 | Welches | 363/41 |
| 2002/0053490 | A1 | * | 5/2002 | Banno et al. | 187/290 |
| 2002/0101749 | A1 | * | 8/2002 | Ulrich | 363/95 |

* cited by examiner

*Primary Examiner*—Karen Masih
(74) *Attorney, Agent, or Firm*—Quarles & Brady, LLP; William R. Walburn

(57) ABSTRACT

Improved voltage stiffness in the output voltage of an inverter used for a motor drive is obtained by a minor voltage feedback loop connecting the output of the inverter to a three-phase input in a vector domain.

18 Claims, 3 Drawing Sheets

MOTOR DRIVE WITH VOLTAGE-ACCURATE INVERTER

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to motor drives and in particular to an improved inverter used in such motor drives.

Motor drives are used to control the speed, torque, or other operating characteristics of AC induction motors.

In a typical large motor drive, three-phase power from a power line is rectified and filtered to provide a source of DC power. The DC power is provided to an inverter which converts the DC power back again to synthesized AC power that is used to drive the motor. By changing the frequency of the synthesized AC power, the speed or torque of the induction motor may be affected.

In operation, a controller within the motor drive receives a command signal from a user, for example, torque or speed, and provides the inverter with input signals indicating the desired characteristics of the synthesized AC power needed to achieve that torque or speed. The inverter receives the input signals and converts them to gate pulses driving solid state semiconductor switches, such as insulated gate bipolar transistors (IGBT), rapidly between on and off states in a class D or switching mode. The result is a duty cycle or pulse width modulated pulse train whose average voltage or current mirrors that of the desired synthesized AC power. Such switched operation is power efficient because it runs the solid state switching devices principally in a low power dissipation region where the solid-state devices are either fully conductive or non-conductive.

Despite the efficiency of such inverters, the voltage output of such inverters may not be an accurate representation of the input inverter signals particularly at lower voltages. Much of this accuracy problem appears to result from a non-linearity of the characteristics of the switching devices. For example, a variable delay in switching speed in the devices will affect the amplitude and phase of the synthesized waveform.

One method of addressing inverter voltage inaccuracy is by modeling the nonlinearity of the switching devices and building an inverse model into the circuitry that generates the gate pulses for the switching devices. To the extent that such nonlinearities may vary from switching device to switching device, this approach requires a cumbersome adjustment of the model used in each inverter.

SUMMARY OF THE INVENTION

The present inventor has determined that modeling nonlinearities of the switching devices can be avoided by the introduction of a minor voltage feedback loop from the output of the inverter to its input. Although current feedback loops are known for the purpose of providing current controlled outputs for inverters, adding of a minor voltage feedback loop significantly improves voltage accuracy beyond that provided by current feedback.

Specifically then, the present invention provides a motor drive having a controller converting command signals to inverter-input signals received by an inverter to produce three-phase motor drive signals. A voltage feedback loop acquires voltage feedback signals measuring the voltage of the three-phase motor drive signals and provides the voltage feedback signals to the controller to correct the inverter-input signals, adjusting the voltage of the three-phase motor drive signals to conform with the inverter input signals.

Thus it is one object of the invention to provide a simple mechanism for correcting for nonlinearities in the inverter that does not require a modeling of inverter nonlinear characteristics.

The controller may include control logic receiving the command signals to produce the inverter input signals as a vector described by a q-component and a d-component; the vector may be received by a first transform means converting the vector to the three-phase sinusoidal signals. The voltage feedback loop may include a second transform means converting the voltage feedback signals to a feedback q-component and a feedback d-component and summers subtracting the feedback q-component from the q-component and subtracting the feedback d-component from the d-component, prior to the q-component and d-component being received by the first transform means.

Thus it is another object of the invention to provide the minor loop voltage feedback at a point of constancy in the error signal allowing improved feedback loop closure. The voltage minor loops are intentionally placed in the synchronously rotating reference frame so that PI regulators can be used to reduce the steady state errors close to zero.

The feedback loop may further include a proportional-integral controller positioned between the summer and the transform means for modifying the q-component and the d-component by an integral and proportional factor.

Thus it is another object of the invention to compensate for the nonlinearities of the switching devices of the inverter using standard proportional/integral controller factors.

The inverter may be a switched output amplifier.

Thus it is another object of the invention to provide a control loop suitable for use with a switched output amplifier.

The output stage of the inverter may use insulated gate bipolar transistors.

Thus it is another object of the invention to provide a system that works with the nonlinearities of commonly used solid state switching devices.

The system may further include a current feedback loop accepting feedback current from the three-phase motor drive signals and providing the current feedback signals to the controller to produce corrected inverter input signals.

Thus it is another object of the invention to provide a feedback voltage loop that works with existing current control loops in a motor drive.

The motor drive may further include a command feedback loop accepting feedback signals from a feedback sensor physically communicating with the motor and providing the command feedback signals to the controller to adjust the operation of the motor to better conform to the command signal.

Thus it is another object of the invention to provide a voltage feedback loop that works within standard feedback provided for motor drive systems.

These particular objects and advantages may apply to only some embodiments falling within the claims and thus do not define the scope of the invention.

DETAILED DESCRIPTION OF THE PREFERRED EMBODIMENT

Figure 1:
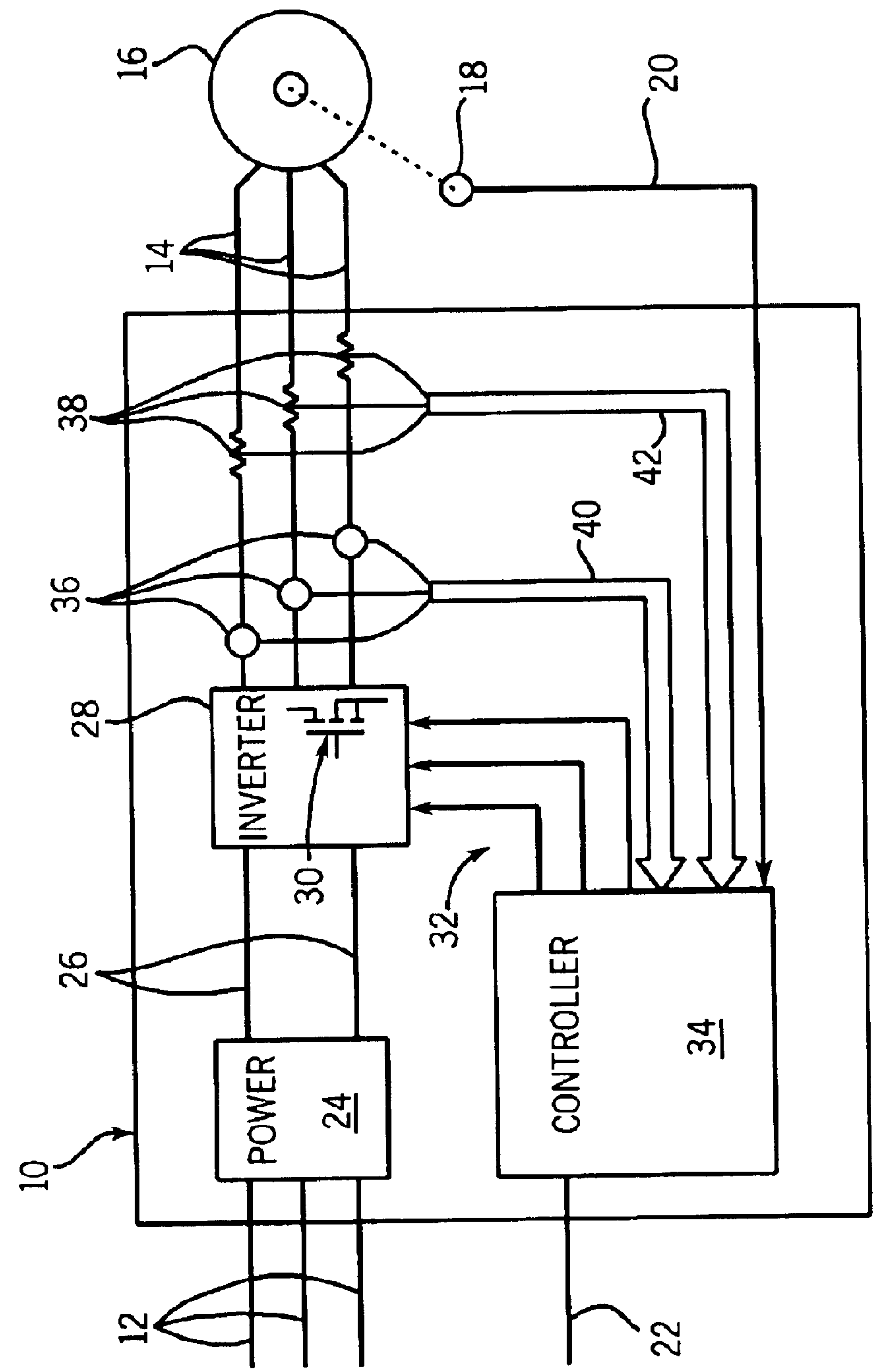
FIG. 1 is a block diagram of a motor drive suitable for use with the present invention having a DC power supply, an inverter producing three-phase motor drive signals and a controller receiving command signals to produce inverter input signals.

Referring now to FIG. 1, a motor drive 10 may receive a command signal 22 from a user or an external device providing a desired motor torque, motor speed, motor position or the like for control of a motor three-phase induction motor 16. The motor drive 10 accepts AC power from a three-phase line 12 and produces synthesized three-phase motor drive signals 14 for the induction motor 16 according to the command signal 22.

The three-phase line 12 is received by a power supply 24 within the motor drive 10, the power supply 24 rectifying and filtering the three-phase power of the line 12 to provide a source of DC power 26. The DC power 26 is then provided to an inverter 28 having solid state switching devices 30 (only one shown for simplicity) such as insulated gate bipolar transistors (IGBT) which modulate the DC power 26 to synthesize the three-phase motor drive signals 14 according to inverter input signals 32 received from a controller 34. Generally, the inverter input signals 32 are three sinusoidal waveforms, one for each phase, varying in shape, phase, and frequency according to the demands of the command signal 22.

As is understood in the art, the inverter 28 may be operated in a switched mode in which the switching devices 30 are switched between ON and OFF states rapidly at a frequency higher than that of the frequency of the three-phase motor drive signals 14. The duty cycle of the switching of the switching devices 30 provides for the desired average voltage and current needed by the output signal. Generally, however, the three-phase motor drive signals 14 are three different high frequency square waves, one associated with each power phase.

The three-phase motor drive signals 14 may be received by current sensors 36 and voltage sensors 38 providing current feedback signals 40 and voltage feedback signals 42 to the controller 34. The current feedback signals 40 may provide a measurement of current in each of the three conductors providing the three-phase motor drive signals 14 or in two of the conductors with the current in the third conductor deduced. The three-phase motor drive signals are also provided to the motor 16 which may be attached to an encoder or other feedback sensor 18 providing a motor feedback signal 20. The controller 34 receives the feedback signals 40, 42, and 20 and the command 22 to generate the necessary inverter input signals 32.

Figure 2:
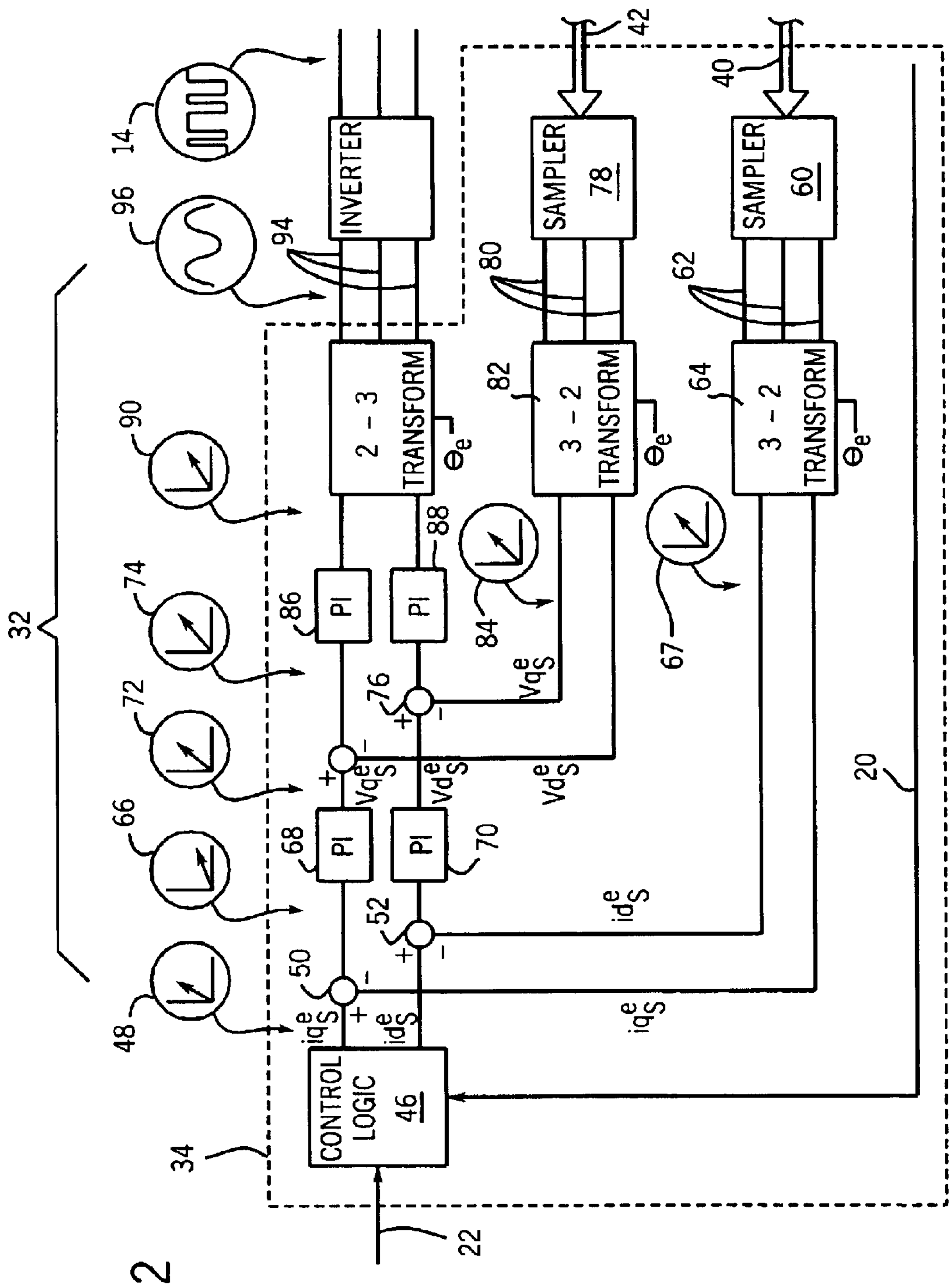
FIG. 2 is a detailed block diagram of the controller of FIG. 1 showing control logic producing a vector inverter input signal (rotating framework) converted to a three-phase inverter input signal (stationary framework) and the implementation of a voltage feedback loop for controlling the voltage of the three-phase motor drive signals by modifying the vector inverter input signal.

Referring now to FIG. 2, the command signal 22 may be received at control logic 46 within the controller 34, the control logic 46 also receiving the motor feedback signal 20. The control logic 46 is constructed according to techniques known in the art to produce a current vector 48 having a d-term $i_{qs}^{e}$ and a q-term $i_{ds}^{e}$ describing an in-phase (d) and quadrature (q) component of the vector. As is generally understood in the art, the current vector 48 is a vector having direction and magnitude in a rotating framework keyed to a frequency $\theta_e$ of the three-phase motor drive signals 14. Thus, $\theta_e$ is equal to the rotational rate of the motor $\theta_r$ plus the slippage $\theta_s$. The two values $i_{ds}^{e}$ and $i_{ds}^{e}$ uniquely describe in static form a set of three time varying sinusoidal signals separated by 120 degrees and forming the basis for the inverter input signals 32. This representation of three sinusoidal signals will be termed a rotating framework representation whereas the three sinusoidal waveforms will be termed a stationary framework representation. Transformation from a rotating framework representation to a stationary framework representation and vice versa is well known in the art, The super script e denotes that the quantity is in synchronous reference frame, subscript s denotes that the quantity is a stator quantity.

The values $i_{ds}^{e}$ and $i_{qs}^{e}$ are provided to the non-inverting input of summers 50 and 52, respectively.

Referring still to FIG. 2, the voltage feedback signals 40 are received by a sampling circuit 60 which samples the square wave waveform of the three-phase motor drive signals 14 at a high rate and then averages the samples over a window to produce three-phase average voltage feedback signals 62. Each of these signals is essentially sinusoidal and varying in phase from one another by 120 degrees per the three-phase motor drive signals 14.

The three-phase average current feedback signals 62 are received by a 3-2 transformer 64 which converts the stationary framework representation of the feedback to a rotating framework representation using the value $\theta_e$ which may be produced by the control logic 46 according to methods well known in the art. The result is a single current feedback vector 67 also having $i_{ds}^{e}$ and $i_{qs}^{e}$ components. These $i_{ds}^{e}$ and $i_{qs}^{e}$ components of the current feedback vector 67 are provided to the inverting inputs of summers 50 and 52 and serve to correct the current vector 48 producing modified current vector 66 so as to bring the value of current of the three-phase motor drive signals 14 into closer alignment with the current vector 48 generated from the command 22.

The $i_{ds}^{e}$ and $i_{qs}^{e}$ components of the modified current vector 66 are received by proportional/integral controllers 68 and 70, respectively, which multiply the $i_{ds}^{e}$ and $i_{qs}^{e}$ components by a proportional factor and sum that to a time integral of the $i_{ds}^{e}$ and $i_{qs}^{e}$ components times an integral factor, as is understood in the art, to produce a voltage vector 72, also having a $v_{ds}^{e}$ and $v_{qs}^{e}$ component. These $v_{ds}^{e}$ and $v_{qs}^{e}$ components are provided to summers 75 and 76, respectively, at their non-inverting inputs.

The voltage feedback signals 42 may be received by a sampler 78 similar to sampling circuit 60 providing a high-speed sampling of the voltage square wave of the three-phase motor drive signals 14 that is averaged to provide a set of three sinusoidal voltage feedback waveforms 80. These wave forms 80 are received by 3-2 transformer 82 similar to that of 3-2 transformer 64 also receiving a θ $\theta_e$ value to provide a feedback voltage vector 84 represented as two components $v_{ds}^{e}$ and $v_{qs}^{e}$ component. These components are provided, respectively, to the inverting inputs of summers 75 and 76. The outputs of summers 75 and 76 provide a modified voltage vector 74 provided, respectively, to the proportional/integral controllers 86 and 88 similar to the proportional/integral controllers 68 and 70 described above.

The outputs of the proportional/integral controllers 86 and 88 together form an error vector 90 providing a correction to the vector 48 intended to bring the current and voltage of the three-phase motor drive signals 14 of the inverter 28 into better conformity with the vector 48.

The error vector 90 is provided to a 2-3 transformer 92 which operates substantially in the opposite manner as 3-2 transformers 64 and 82 to produce three-phase signals 94 being essentially sinusoidal signals 96 that are provided to the inverter 28.

As is understood in the art, the inverter 28 takes the sinusoidal signals 96 and produces the necessary gate drive signals to produce the three-phase motor drive signals 14.

The components of the controller 34 may be implemented in discrete circuitry or may be implemented as a program running on a processor within the controller 34 or by combinations of these approaches or other techniques well known in the art.

Figure 3:
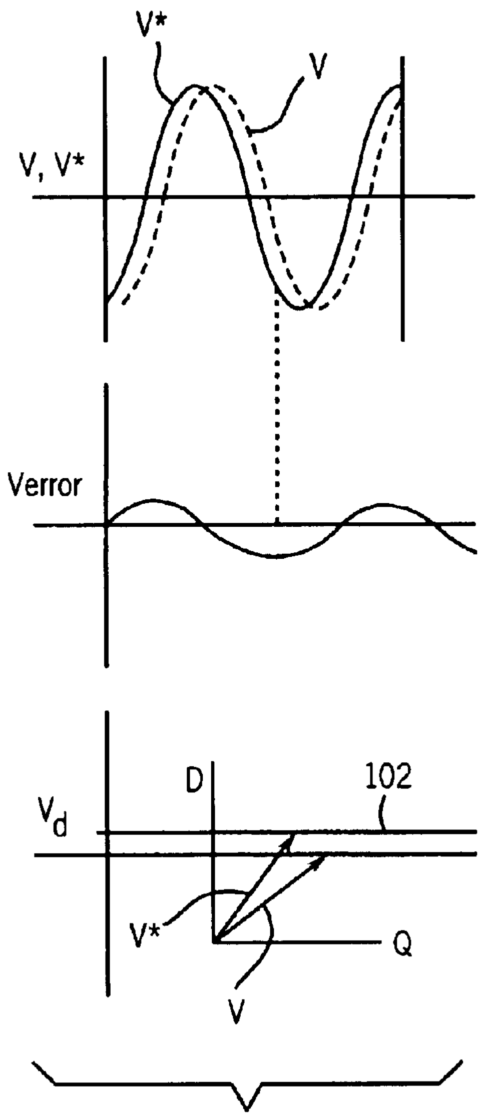
FIG. 3 is a set of graphs on common time axes showing desired and actual three-phase motor drive signals shifted in phase, voltage error in the stationary framework, and voltage error in rotating framework.

Referring now also to FIG. 3, voltage vector 72 of FIG. 2 (v*) may have a slight phase difference with respect to voltage v of three-phase motor drive signals 14. In stationary framework, the difference between these waveforms v* and v, indicated by voltage $v^e$ is a sinusoidal voltage with a frequency substantially equal to $\theta_e$. In the rotating framework dimensions of d and q, however, the error voltage (for example, $v_{ds}^e$ is a substantially constant value 102) (here shown as the vertical or q axis difference between the two phases representing v and v*). Accordingly, a proportional/integral controller may provide through its integral term more accurate reduction in this error.

Figure 4:
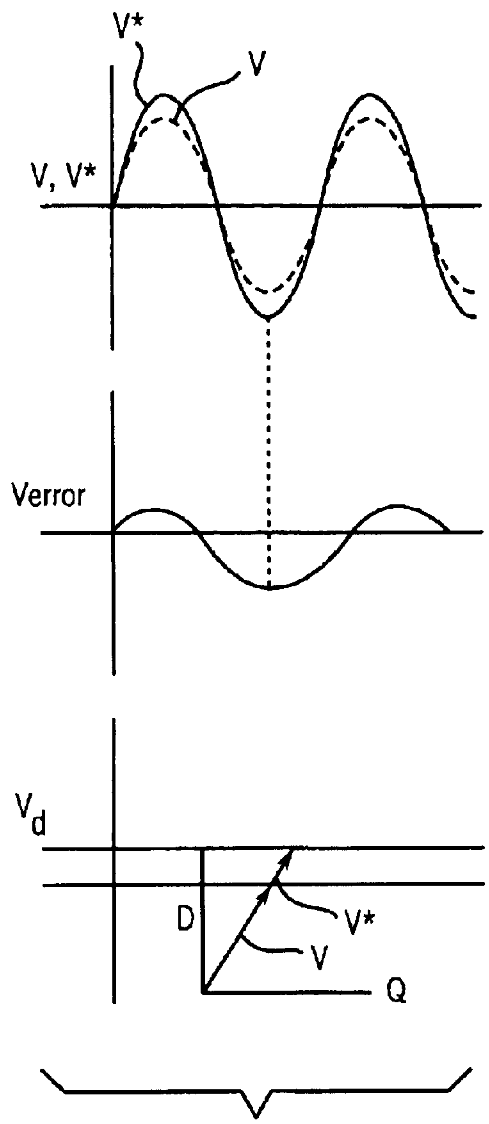
FIG. 4 is a figure similar to that of FIG. 3 showing desired and actual three-phase motor drive signals shifted in amplitude, voltage error in stationary framework, and voltage error in rotating framework.

Similarly, referring to FIG. 4, a slight amplitude difference between v and v* provides a voltage error signal $v^e$ that is sinusoidally varying rendering the use of an integral correction problematic for the control of this error. Nevertheless, the d (and q) component of the error is a relatively constant value that may be controlled using an integration. In this way, nonlinearities in the switching devices 30 that produce amplitude or phase shifts can be corrected through the use of a voltage feedback loop.

It is specifically intended that the present invention not be limited to the embodiments and illustrations contained herein, but include modified forms of those embodiments including portions of the embodiments and combinations of elements of different embodiments as come within the scope of the following claims.

I claim:

1. In a motor drive providing a controller converting command signals to inverter-input signals received by an inverter to produce three-phase motor drive signals, an improvement comprising:

a voltage feedback loop acquiring voltage feedback signals measuring the voltage of the three-phase motor drive signals and providing the voltage feedback signals to the controller to correct the inverter-input signals to adjust the voltage of the three-phase motor drive signals to conform with the inverter input signals;

wherein the controller includes control logic receiving the command signals to produce the inverter input signals as a vector described by a q-component and a d-component, the vector received by a first transform means converting the vector to the three-phase sinusoidal signals, wherein the voltage feedback loop includes a second transform means converting the voltage feedback signals to a feedback q-component and a feedback d-component and summers subtracting the feedback q-component from the q-component and subtracting the feedback d-component from the d-component, prior to the q-component and d-component being received by the first transform means.

2. The motor drive of claim 1 wherein the voltage feedback loop further includes a proportional-integral controller positioned between the summers and the first transform means for modifying the received q-component and d-component by an integral and proportional factor.

3. The motor drive of claim 1 wherein the three-phase motor drive signals are switched voltage signals and wherein the voltage feedback loop includes a sampler, sampling the three-phase motor drive signals and combining successive samples to produce sinusoidal waveforms.

4. The motor drive of claim 1 wherein the inverter is a switched output amplifier.

5. The motor drive of claim 4 wherein an output stage of the inverter uses insulated gate bipolar transistors.

6. The motor drive of claim 1 further including a current feedback loop acquiring current feedback signals from the three-phase motor drive signals and providing the current feedback signals to the controller to correct the inverter-input signals to adjust the current of the three-phase motor drive signals to better conform with the inverter input signals.

7. The motor drive of claim 6 wherein the controller includes control logic receiving the command signals to produce the inverter input signals as a vector described by a q-component and a d-component, the vector received by a first transform means converting the vector to three-phase sinusoidal signals, wherein the current feedback loop includes a second transform means converting the feedback current signals to a feedback q-component and a feedback d-component and a summer subtracting the feedback q-component from the q-component and subtracting the feedback d-component from the d-component, prior to the q-component and d-component being received by the first transform means.

8. The motor drive of claim 7 wherein the current feedback loop further includes a proportional-integral controller positioned between the summers and the first transform means for modifying the q-component and d-component by and integral and proportional factor.

9. The motor drive of claim 8 wherein the voltage feedback loop includes a transform means converting the feedback voltage signals to a feedback q-component and a feedback d-component and a summer subtracting the feedback q-component from the q-component and subtracting the feedback d-component from the d-component, prior to the q-component and d-component being received by the first transform means and wherein the voltage feedback loop further includes a second proportional-integral controller positioned between the summers and the transform means for modifying the q-component and d-component by an integral and proportional factor.

10. The motor drive of claim 1 further including a command feedback loop accepting command feedback signals from a feedback sensor physically communicating with a motor receiving the three-phase motor drive signals and providing the command feedback signals to the controller to adjust the operation of the motor to better conform to the command signal, wherein the feedback signals from the feedback sensor are selected from the group consisting of: motor speed, motor torque, and motor position.

11. A method of controlling a motor using a motor drive having a controller converting command signals to inverter-input signals received by an inverter to produce three-phase motor drive signals, comprising the steps of:

(a) measuring the voltage of the three-phase motor drive signals to produce voltage feedback signals; and (b) providing the voltage feedback signals to the controller to correct the inverter-input signals to adjust the voltage of the three-phase motor drive signals to conform with the inverter input signals;

further including the steps of:

producing the inverter input signals as a vector described by a q-component and a d-component;

transforming the voltage feedback signals to a feedback q-component and a feedback d-component; and subtracting the feedback q-component from the q-component and subtracting the feedback d-component from the d-component, prior to the q-component and d-component to correct the inverter input signals.

12. The method of claim 11 further including the step of modifying the received q-component and d-component by an integral and proportional factor.

13. The method of claim 11 wherein the three-phase motor drive signals are switched voltage signals and including the step of sampling the three-phase motor drive signals and combining successive samples to produce sinusoidal waveforms.

14. The method of claim 11 further including the steps of:

acquiring current feedback signals from the three-phase motor drive signals; and providing the current feedback signals to the controller to correct the inverter-input signals to adjust the current of the three-phase motor drive signals to better conform with the inverter input signals.

15. The method of claim 14 further including the steps of:

producing the inverter input signals as a vector described by a q-component and a d-component;

transforming the feedback current signals to a feedback q-component and a feedback d-component; and subtracting the feedback q-component from the q-component and subtracting the feedback d-component from the d-component, to correct the inverter input signals.

16. The method of claim 15 further including the step of modifying the q-component and d-component by an integral and proportional factor.

17. The method of claim 16 further including the steps of:

converting the feedback voltage signals to a feedback q-component and a feedback d-component;

subtracting the feedback q-component from the q-component and subtracting the feedback d-component from the d-component; and modifying the q-component and d-component by an integral and proportional factor.

18. The method of claim 17 further including the steps of:

acquiring command feedback signals from a feedback sensor physically communicating with a motor receiving the three-phase motor drive signals; and providing the command feedback signals to the controller to adjust the operation of the motor to better conform to the command signal, wherein the feedback signals from the feedback sensor are selected from the group consisting of: motor speed, motor torque, and motor position.

* * * * *